US012744013B2

(12) United States Patent
Lin et al.

(10) Patent No.: US 12,744,013 B2
(45) Date of Patent: Sep. 22, 2026

(54) ELECTRONIC DEVICE

(71) Applicant: Innolux Corporation, Miaoli County (TW)

(72) Inventors: Yi-Hung Lin, Miaoli County (TW); Kung-Chen Kuo, Miaoli County (TW); Tong-Jung Wang, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 0 days.

(21) Appl. No.: 19/071,761

(22) Filed: Mar. 6, 2025

(65) Prior Publication Data

US 2025/0322804 A1 Oct. 16, 2025

Related U.S. Application Data

(60) Provisional application No. 63/632,014, filed on Apr. 10, 2024.

(30) Foreign Application Priority Data

Oct. 16, 2024 (CN) ........................ 202411447369.7

(51) Int. Cl.
*G09G 3/34* (2006.01)

(52) U.S. Cl.
CPC ... *G09G 3/3426* (2013.01); *G09G 2300/0852* (2013.01); *G09G 2310/0267* (2013.01); *G09G 2330/045* (2013.01); *G09G 2330/06* (2013.01)

(58) Field of Classification Search
CPC ......... G09G 3/3426; G09G 2300/0852; G09G 2310/0267; G09G 2330/045; G09G 2330/06
See application file for complete search history.

(56) References Cited

U.S. PATENT DOCUMENTS

| | | | | |
|---|---|---|---|---|
| 4,887,053 | A * | 12/1989 | Embree | H03B 5/368<br>331/108 A |
| 10,380,939 | B2 * | 8/2019 | Minami | H10K 59/1213 |
| 11,302,635 | B2 | 4/2022 | Hung et al. | |
| 12,089,345 | B2 | 9/2024 | Lin et al. | |
| 12,175,925 | B2 * | 12/2024 | Watsuda | G09G 3/30 |
| 12,520,665 | B2 * | 1/2026 | Hao | H10K 59/1213 |
| 2008/0111955 | A1 * | 5/2008 | Lu | G02F 1/134309<br>349/106 |
| 2015/0037934 | A1 | 2/2015 | Yamazaki | |

(Continued)

*Primary Examiner* — Jeff Piziali
(74) *Attorney, Agent, or Firm* — JCIPRNET

(57) ABSTRACT

Provided is an electronic device that includes a substrate, a gate driving element, a first switching element, a second switching element, and multiple electronic elements. The gate driving element is disposed on the substrate. The first switching element is disposed on the substrate and has a first gate drain capacitance. The second switching element is disposed on the substrate and has a second gate drain capacitance. In a first direction, a distance between the gate driving element and the first switching element is less than a distance between the gate driving element and the second switching element. The first gate drain capacitance is less than the second gate drain capacitance. The multiple electronic elements are arranged in the first direction. One of the multiple electronic elements is electrically connected to the first switching element and includes at least one variable capacitor, light emitting diode or solar cell.

18 Claims, 6 Drawing Sheets

(56) References Cited

U.S. PATENT DOCUMENTS

| | | | | |
|---|---|---|---|---|
| 2021/0193013 | A1* | 6/2021 | Xu | H10K 59/353 |
| 2021/0256926 | A1* | 8/2021 | Yun | G09G 3/3614 |
| 2021/0325715 | A1* | 10/2021 | Lee | G02F 1/136286 |
| 2022/0216302 | A1 | 7/2022 | Yeh et al. | |
| 2022/0254763 | A1 | 8/2022 | Chi et al. | |
| 2022/0367370 | A1 | 11/2022 | Chi et al. | |
| 2023/0077359 | A1 | 3/2023 | Hashimoto | |
| 2023/0131442 | A1 | 4/2023 | Lin et al. | |
| 2023/0138001 | A1* | 5/2023 | Hao | H10K 59/1213<br>345/206 |
| 2023/0206874 | A1* | 6/2023 | Ban | G09G 3/3266<br>345/214 |
| 2023/0421135 | A1 | 12/2023 | Tseng et al. | |
| 2024/0032192 | A1 | 1/2024 | Huang | |
| 2024/0074237 | A1* | 2/2024 | Wang | H10K 59/352 |
| 2024/0186454 | A1* | 6/2024 | Liu | H10H 20/819 |
| 2024/0211067 | A1* | 6/2024 | Wang | G06F 3/0412 |
| 2024/0223246 | A1 | 7/2024 | Yeh et al. | |
| 2024/0372533 | A1 | 11/2024 | Ting et al. | |
| 2024/0373558 | A1 | 11/2024 | Ting et al. | |
| 2024/0379641 | A1 | 11/2024 | Chi et al. | |
| 2024/0421476 | A1 | 12/2024 | Hsieh et al. | |
| 2025/0037646 | A1* | 1/2025 | Jo | H01L 25/167 |
| 2025/0081609 | A1* | 3/2025 | Xiao | H10D 86/441 |

* cited by examiner

ELECTRONIC DEVICE

CROSS-REFERENCE TO RELATED APPLICATION

This application claims the priority benefit of U.S. provisional application Ser. No. 63/632,014, filed on Apr. 10, 2024 and China application serial no. 202411447369.7, filed on Oct. 16, 2024. The entirety of the above-mentioned patent application is hereby incorporated by reference herein and made a part of this specification.

BACKGROUND

Technical Field

The disclosure relates to an electronic device.

Description of Related Art

A common electronic device includes a driving element, a switching element, a storage capacitor, and an electronic element. The manner of electrical connection of each component in the switching element and the electronic element is as follows: a gate of the switching element is electrically connected to a scanning line, a source of the switching element is electrically connected to a data line, and a drain of the switching element is electrically connected to the storage capacitor and the electronic element. Based on this, when an appropriate scanning voltage is applied to the scanning line through a gate driving element, the switching element electrically connected to the scanning line may be turned on to allow a data voltage from the data line to drive the electronic element.

When the gate of the switching element is turned off, the capacitance of the gate and the drain may be coupled to generate a feed through voltage. The size of the feed through voltage may affect a difference between the data voltage and the voltage that actually drives the electronic element. The switching element closer to the gate driving element may have a larger feed through voltage. Therefore, if multiple switching elements included in an electronic device are the same with each other, the multiple switching elements with different distances from the gate driving element may have different feed through voltages. This may affect the electrical performance of the electronic device.

SUMMARY

The disclosure provides an electronic device of which the electrical performance may be increased.

The electronic device according to the disclosure includes a substrate, a gate driving element, a first switching element, a second switching element, and multiple electronic elements. The gate driving element is disposed on the substrate. The first switching element is disposed on the substrate and has a first gate drain capacitance. The second switching element is disposed on the substrate and has a second gate drain capacitance. In a first direction, a distance between the gate driving element and the first switching element is less than a distance between the gate driving element and the second switching element. The first gate drain capacitance is less than the second gate drain capacitance. The multiple electronic elements are arranged in first direction. One of the multiple electronic elements is electrically connected to the first switching element and includes at least one of a variable capacitor, a light emitting diode or a solar cell. Another one of the multiple electronic elements is electrically connected to the second switching element and includes at least one of a variable capacitor, a light emitting diode or a solar cell.

Based on the above, in the electronic device provided by an embodiment of the disclosure, each switching element may generate a similar feed through voltage when turned off through allowing the switching element closer to the gate driving element to have a lower gate drain capacitance. Based on this, the electrical performance of the electronic device provided by an embodiment of the disclosure may be increased.

In order to make the features and advantages of the disclosure more comprehensible, the following examples are given and described in detail with the accompanying drawings as follows.

DESCRIPTION OF THE EMBODIMENTS

Figure 1:
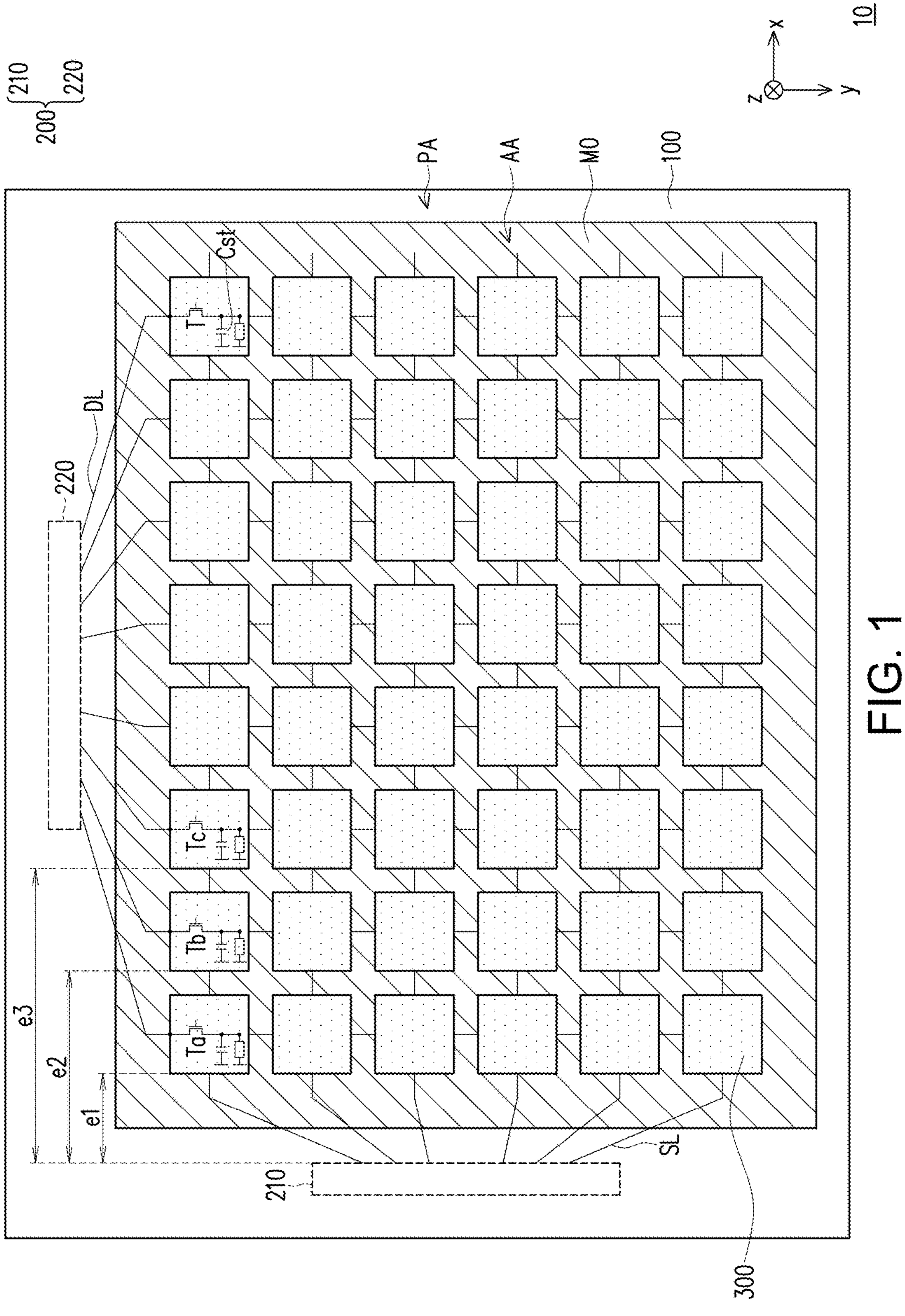
FIG. 1 is a schematic top view of an electronic device according to an embodiment of the disclosure.

The disclosure can be understood by referring to the following detailed description in conjunction with the drawings. It should be noted that in order to facilitate the understanding of the reader and the brevity of the drawings, multiple drawings in the disclosure only depict a part of an electronic device, and specific elements in the drawings are not drawn according to actual scale. In addition, the number and the size of each element in the drawings are for illustration only and are not intended to limit the scope of the disclosure.

Throughout the specification and the appended claims of the disclosure, certain terms may be used to refer to specific elements. It should be understood by persons skilled in the art that electronic device manufacturers may refer to the same element by different names. The disclosure does not intend to distinguish between elements with the same function but different names. In the following specification and claims, terms such as “including”, “containing”, and “having" are open-ended terms, so the terms should be interpreted as "containing but not limited to . . . ". Therefore, when the terms "including", "containing", and/or "having" are used in the description of the disclosure, the terms designate the presence of a corresponding feature, region, step, operation, and/or component, but do not exclude the presence of one or more corresponding features, regions, steps, operations, and/or components.

Directional terms such as "upper", "lower", "front", "rear", "left", and "right" according to the disclosure are only directions with reference to the drawings. Therefore, the used directional terms are used to illustrate, but not to limit, the disclosure. In the drawings, each drawing illustrates the general features of a method, a structure, and/or a material used in a specific embodiment. However, the drawings should not be construed to define or limit the scope or nature covered by the embodiments. For example, for clarity, relative sizes, thicknesses, and positions of various film layers, regions, and/or structures may be reduced or enlarged.

When a corresponding component (for example, a film layer or a region) is referred to as being "on another component", the component may be directly on the other component or there may be another component between the two. On the other hand, when a component is referred to as being "directly on another component", there is no component between the two. In addition, when a component is referred to as being "on another component", the two have an upper-lower relationship in the top view direction, and the component may be above or below the other component, and the upper-lower relationship depends on the direction of the device.

The terms "about", "substantially", or "roughly" are generally interpreted as within 20% of a given value or range or interpreted as within 10%, 5%, 3%, 2%, 1%, or 0.5% of the given value or range.

Ordinal numbers such as "first" and "second" used in the specification and the claims are used to modify elements, and the terms do not imply and represent that the element(s) have any previous ordinal numbers, nor do they represent the order of a certain element and another element or the order of a manufacturing method. The use of the ordinal numbers is only to clearly distinguish between an element with a certain name and another element with the same name. The claims and the specification may not use the same terms, whereby a first component in the specification may be a second component in the claims.

It should be noted that in the following embodiments, features in several different embodiments may be replaced, recombined, and mixed to complete other embodiments without departing from the spirit of the disclosure. As long as the features of the various embodiments do not violate the spirit of the invention or conflict with each other, the features may be arbitrarily mixed and matched for use.

Electrical connection described in the disclosure may refer to direct connection or indirect connection. In the case of direct connection, terminals of elements on two circuits are directly connected or connected to each other by a conductor segment.

In the disclosure, the measurement manner of thickness, length, width, and area may be by adopting an optical microscope, and the thickness may be obtained by measuring a cross-sectional image in an electron microscope, but not limited thereto. In addition, there may be a certain error in any two values or directions for comparison. If a first value is equal to a second value, it implies that there may be an error of about 10% between the first value and the second value. If a first direction is perpendicular to a second direction, an angle between the first direction and the second direction may be between 80 degrees and 100 degrees; and if the first direction is parallel to the second direction, the angle between the first direction and the second direction may be between 0 degrees and 10 degrees.

The electronic device described in the disclosure may be applied to a display device, a light-emitting device, a backlight device, a tiling device, a virtual reality device, an augmented reality device, an antenna device, or a sensing device, but not limited thereto. The electronic device may be a bendable or flexible electronic device. The electronic device may include, for example, liquid crystal, a light-emitting diode, fluorescence, phosphor, other suitable display media, or a combination of the above, but not limited thereto. The display device may be a non-self-luminous display device or a self-luminous display device. The antenna device may be a liquid crystal antenna device or a non-liquid crystal antenna device, and the sensing device may be a sensing device for sensing capacitance, light, heat energy, or ultrasonic waves, but not limited thereto. The electronic device may include, for example, an electronic element such as a passive component and an active component, such as a capacitor, a resistor, an inductor, a diode, and a transistor. The diode may include a light-emitting diode or a photodiode. The light-emitting diodes may include, for example, an organic light-emitting diode (OLED), a mini LED, a micro LED, or a quantum dot LED, but not limited thereto. The tiling device may be, for example, a display tiling device or an antenna tiling device, but not limited thereto. It should be noted that the electronic device may be any permutation and combination of the above, but not limited thereto. In addition, the appearance of the electronic device may be a rectangle, a circle, a polygon, a shape with curved edges, or other suitable shapes. The electronic device may have a peripheral system such as a driving system, a control system, and a light source system to support the display device, the antenna device, a wearable devices (such as including augmented reality or virtual reality), a vehicle-mounted device (such as including a car windshield), or the tiling device. It should be noted that the electronic device may be any arrangement and combination of the above, but not limited thereto. In the following, a display device or a tiling device is used as an electronic device to illustrate the content of the disclosure, but the disclosure is not limited thereto.

Examples of exemplary embodiments of the disclosure are given below. The same reference numerals are used in the drawings and descriptions to represent the same or similar parts.

FIG. 1 is a schematic top view of an electronic device according to an embodiment of the disclosure.

Please refer to FIG. 1. The electronic device 10 of the embodiment includes an active region AA and a peripheral region PA. In some embodiments, the peripheral region PA is located on at least one side of the active region AA. In the embodiment, the peripheral region PA surrounds the active region AA, but the disclosure is not limited thereto. The electronic device 10 of the disclosure may be an electronic device such as a display device, an antenna device, a sensing device or a tiling device. In the embodiment, the electronic device 10 includes a substrate 100, a driving element 200, a conductive layer M0, and an electronic element 300.

The material of the substrate 100 may be, for example, glass, plastic or a combination thereof. For example, the material of the substrate 100 may include quartz, sapphire, polymethyl methacrylate (PMMA), polycarbonate (PC), polyimide (PI), polyethylene terephthalate (PET), other suitable materials or a combination of the foregoing materials, and the disclosure is not limited thereto.

The driving element 200 is, for example, disposed on the substrate 100, and is, for example, disposed in the peripheral region PA of the electronic device 10. In some embodiments, the driving element 200 is disposed on the surface of the substrate 100 in a chip on glass (COG) manner, but the disclosure is not limited thereto. In other embodiments, the driving element 200 may be disposed on the surface of the substrate 100 in a chip on plastic (COP) manner. Alternatively, in some embodiments, the driving element 200 includes a driving circuit and is directly disposed on the surface of the substrate 100 (gate on panel; GOP). In the embodiment, the driving element 200 includes a gate driving element 210 and a source driving element 220. It is worth noting that although only one gate driving element 210 and one source driving element 220 are individually illustrated in FIG. 1, the disclosure is not limited thereto. In other embodiments, the electronic device 10 may include more than two gate driving elements 210 and more than two source driving elements 220 disposed on the surface of the substrate 100.

The conductive layer M0 is, for example, disposed on the substrate 100, and is, for example, disposed in the active region AA of the electronic device 10, but the disclosure is not limited thereto. In other embodiments, the conductive layer M0 may extend into the peripheral region PA to serve as a heat dissipation layer, an electrostatic protection layer, an electromagnetic interference shielding layer, or a combination thereof for the electronic device 10. The material of the conductive layer M0 may include, for example, low resistance materials such as silver, copper, gold, aluminum, tin, nickel or a combination thereof. However, the material of the conductive layer M0 may also be, for example, other appropriate materials or a combination of the foregoing materials, and the disclosure is not limited thereto. In some embodiments, the conductive layer M0 may have a rectangular shape in a top view direction z of the electronic device 10, but the disclosure is not limited thereto.

The electronic element 300 is, for example, disposed on the conductive layer M0. In some embodiments, the electronic elements 300 are disposed at intervals on conductive layer M0. For example, as shown in FIG. 1, the multiple electronic elements 300 are arranged in an array on the conductive layer M0, but the disclosure is not limited thereto. In other embodiments, the multiple electronic elements 300 may be, for example, arranged in a staggered arrangement (such as a pentile manner) or disposed in other manners on the conductive layer M0. In some embodiments, the electronic element 300 includes a variable capacitor, a light emitting diode, a solar cell or other suitable electronic elements, and the disclosure is not limited thereto.

In the embodiment, the electronic device 10 further includes a switching element T and a storage capacitor Cst. The switching element T and the storage capacitor Cst are electrically connected to the electronic element, but the disclosure is not limited thereto. The storage capacitor Cst may be formed, for example, by a first conductive layer (not shown), an insulating layer (not shown) and a second conductive layer (not shown) sequentially stacked on one another in the top view direction z of the electronic device 10, but the disclosure is not limited thereto.

The detailed structure of the switching element T will be described below with reference to multiple embodiments, but the disclosure is not limited thereto.

Figure 2A:
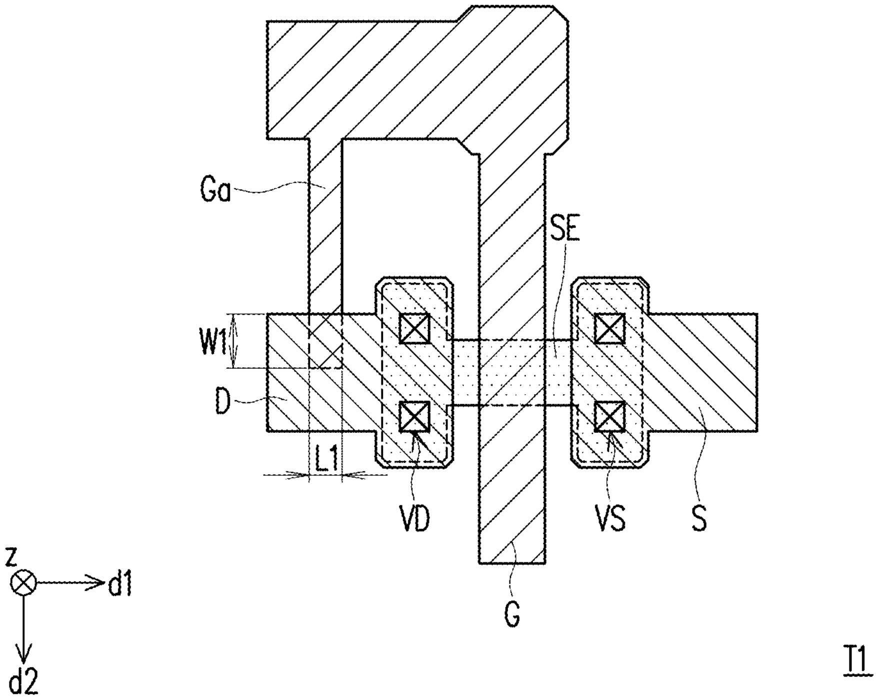
FIG. 2A is a schematic partial top view of a first embodiment of the switching element in the electronic device in FIG. 1.

FIG. 2A is schematic a partial top view of a first embodiment of the switching element in the electronic device in FIG. 1. It should be noted that the embodiment of FIG. 2A can use the reference numerals and part of the content of the embodiment of FIG. 1. The same or similar reference numerals are used to represent the same or similar elements, and descriptions of the same technical content are omitted.

Please refer to FIG. 2A first. In the embodiment, a switching element T1 includes a gate G, a source S, a drain D and a semiconductor layer SE. In some embodiments, the material of the semiconductor layer SE includes low temperature polysilicon (LTPS), oxide semiconductors, or amorphous silicon (a-Si), but the disclosure is not limited thereto. For example, the material of the semiconductor layer SE may include, but is not limited to, amorphous silicon, polycrystalline silicon, germanium, compound semiconductors (such as gallium nitride, silicon carbide, gallium arsenide, gallium phosphide, indium phosphide, indium arsenide and/or or indium antimonide), alloy semiconductors (such as SiGe alloy, GaAsP alloy, AlInAs alloy, AlGaAs alloy, GaInAs alloy, GaInP alloy, or GaInAsP alloy), or a combination of the foregoing materials. The material of the semiconductor layer SE may also include, but is not limited to, metal oxides, such as indium gallium zinc oxide (IGZO), indium zinc oxide (IZO), indium gallium zinc oxide (IGZTO), or organic semiconductors including polycyclic aromatic compounds, or a combination of the foregoing materials. The gate G, for example, at least partially overlaps with the semiconductor layer SE in the top view direction z of the electronic device 10. The source S and the drain D, for example, are separated from each other, and may be electrically connected to each other through a via VS and a via VD in the insulating layer (not shown) that is between the source S and the semiconductor layer SE and between the drain D and the semiconductor layer SE, but the disclosure is not limited thereto. In some embodiments, the drain D may be electrically connected to the storage capacitor Cst and the electronic element. The switching element T may be, for example, a bottom gate thin film transistor, a top gate thin film transistor, or other thin film transistors that are well known to those skilled in the art, and the disclosure is not limited thereto.

In the embodiment, the switching element T1 is a top gate thin film transistor, and the gate G of the switching element T1 includes a branch portion Ga. The branch portion Ga extends toward a direction d2 and partially overlaps with the drain D in the top view direction z of the electronic device 10. In the embodiment, a part where the branch portion Ga overlaps with the drain D in a direction d1 has a length L1, and the part where the branch portion Ga overlaps with the drain D in the direction d2 has a width W1. Since the feed through voltage (Vft) generated by the switching element T1 when turned off conforms to the following formula, when the switching element T1 is further away from the gate driving element 210 in a direction x, the difference between a voltage before turned off (Vgh) and a voltage after turned off (Vgl) may be less. Therefore, when the multiple switching elements T1 are the same switching elements, the switching element T1 further away from the gate driving element 210 may generate a lower feed through voltage (Vft).

In the embodiment, each switching element T1 may generate a similar feed through voltage when turned off through adjusting the length L1 and/or the width W1 of the part where the branch portion Ga overlaps with the drain D. In detail, as the switching element T1 is further away from the gate driving element 210 in the direction x, the length L1 in the direction d1 and/or the width W1 in the direction d2 of the branch portion Ga is adjusted to increase the area where the gate G overlaps with the drain D in order to increase the gate drain capacitance (Cgd) to allow each switching element T1 to generate a similar feed through voltage when turned off. In other words, the switching element T1 arranged in the direction x may have different areas where the gate G overlaps with the drain D. As the switching element T1 is further away from the gate driving element 210 in the direction x, the gate drain capacitance (Cgd) may be increased through allowing the area where the gate G overlap with the drain D to be larger. In the embodiment, as the switching element T1 is further away from the gate driving element 210 in the direction x, the gate drain capacitance (Cgd) is increased through allowing the length L1 of the part where the branch portion Ga overlaps with the drain D to be longer, but the disclosure is not limited thereto.

Please refer to FIG. 1. In some embodiments, at least two switching elements T have different gate drain capacitances (Cgd) in the direction x, but the disclosure is not limited thereto. In other embodiments, at least three switching elements T have different gate drain capacitances (Cgd) in the direction x. For example, a distance e1 between a switching element Ta and the gate driving element 210 is less than a distance e2 between a switching element Tb and the gate driving element 210, and the distance e2 between the switching element Tb and the gate driving element 210 is less than a distance e3 between a switching element Tc and the gate driving element 210.

Therefore, a gate drain capacitance (Cgd) of the switching element Ta is less than a gate drain capacitance (Cgd) of the switching element Tb, and the gate drain capacitance (Cgd) of the switching element Tb is less than a gate drain capacitance (Cgd) of the switching element Tc.

In addition, in some embodiments, at least two switching elements T may have different gate drain capacitances (Cgd) between the gate G and the drain D in a direction y, but the disclosure is not limited thereto. In other embodiments, at least three switching elements T may have different gate drain capacitances (Cgd) in the direction y.

In general, please refer to FIG. 1. The switching element T that is closer to the gate driving element 210 may have a lower gate drain capacitance (Cgd) to allow each switching element T to generate a similar feed through voltage when turned off.

Please continue to refer to FIG. 1. In the embodiment, the electronic device 10 further includes a scanning line SL and a data line DL. The scanning line SL is, for example, disposed on the substrate 100 and is electrically connected to the gate G of the switching element T. The scanning line SL may, for example, be configured to receive a scanning signal from the gate driving element 210 to provide to the corresponding switching element T. In some embodiments, the scanning line SL extends toward the direction x, but the disclosure is not limited thereto. The scanning line SL may, for example, belong to the same layer as the gate G, but the disclosure is not limited thereto. The data line DL is, for example, disposed on the substrate 100 and is electrically connected to the drain D of the switching element T. The data line DL may, for example, be configured to receive a data signal from the source driving element 220 to provide to the corresponding switching element T. In some embodiments, the data line DL extends toward the direction y, but the disclosure is not limited thereto. In the embodiment, the data line DL belongs to the same layer as the source S and the drain D, but the disclosure is not limited thereto.

Figure 2B:
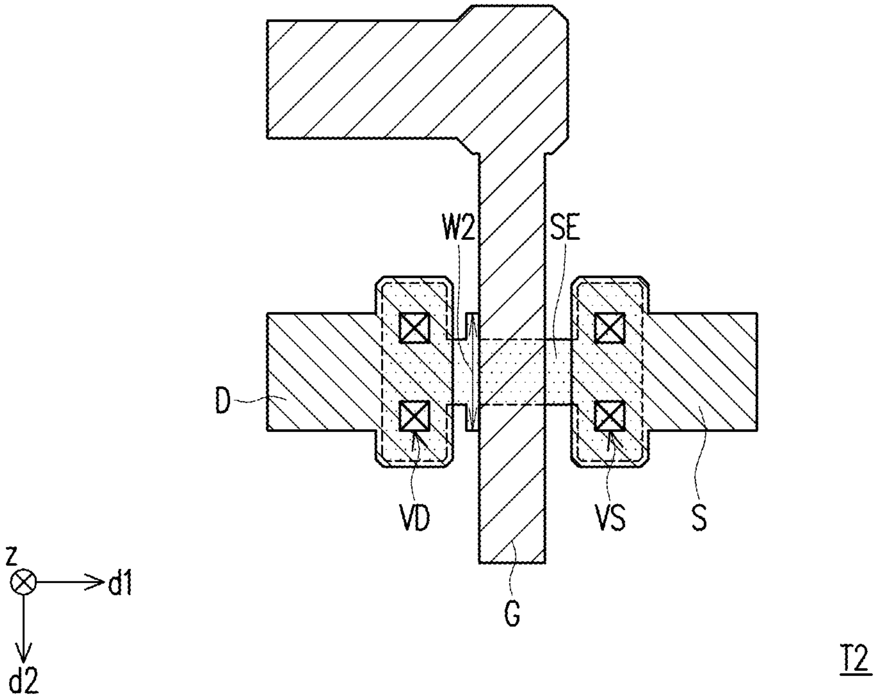
FIG. 2B is a schematic partial top view of a second embodiment of the switching element in the electronic device in FIG. 1.

FIG. 2B is a schematic partial top view of a second embodiment of the switching element in the electronic device in FIG. 1. It should be noted that the embodiment of FIG. 2B can use the reference numerals and part of the content of the embodiment of FIG. 2A. The same or similar reference numerals are used to represent the same or similar elements, and descriptions of the same technical content are omitted.

Please refer to FIG. 2B. The main difference between a switching element T2 of the embodiment and the switching element T1 is that in the switching element T2, a width W2 of a boundary where the gate G that is close to the drain D overlaps with the semiconductor layer SE in the top view direction z of the electronic device 10 is longer.

In the embodiment, the semiconductor layer SE that is close to the drain D may include a part with the width W2 in the direction d2. The width W2 is greater than a channel width in the direction d1.

In the embodiment, each switching element T2 may generate a similar feed through voltage when turned off through adjusting the width W2 of the boundary where the gate G that is close to the drain D overlaps with the semiconductor layer SE. In detail, as the switching element T2 is further away from the gate driving element 210 in the direction x, the width W2 of the boundary where the gate G that is close to the drain D overlaps with the semiconductor layer SE is longer to increase the gate drain capacitance in order to allow each switching element T2 to generate a similar feed through voltage when turned off.

In addition, in the embodiment, the gate G of the switching element T2 does not include the branch portion Ga, but the disclosure is not limited thereto.

Figure 2C:
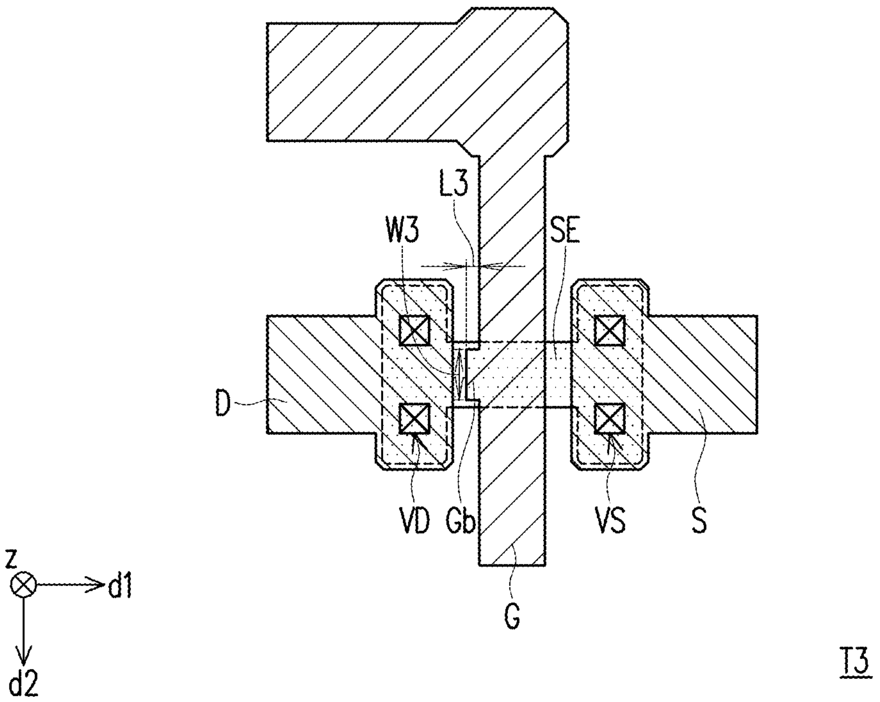
FIG. 2C is a schematic partial top view of a third embodiment of the switching element in the electronic device in FIG. 1.

FIG. 2C is a schematic partial top view of a third embodiment of the switching element in the electronic device in FIG. 1. It should be noted that the embodiment of FIG. 2C can use the reference numerals and part of the content of the embodiment of FIG. 2A. The same or similar reference numerals are used to represent the same or similar elements, and descriptions of the same technical content are omitted.

Please refer to FIG. 2C. The main difference between a switching element T3 of the embodiment and the switching element T1 is that in the switching element T3, the gate G further includes a branch portion Gb extending toward a direction of the drain D, and the branch portion Gb overlaps with the semiconductor layer SE in the top view direction z of the electronic device 10.

In the embodiment, the branch portion Gb of the gate G extends in the direction d2 and is close to the drain D. The branch portion Gb has a length L3 in the direction d1 and a width W3 in the direction d2. The width W3 may be less than a channel width in the direction d1, but the disclosure is not limited thereto.

In the embodiment, each switching element T3 may generate a similar feed through voltage when turned off through adjusting the length L3 in the direction d1 and/or the width W3 in the direction d2 of the branch portion Gb of the gate G. In detail, as the switching element T3 is further away from the gate driving element 210 in the direction x, the length L3 in the direction d1 and/or the width W3 in the direction d2 of the branch portion Gb is adjusted to increase an area where the gate G overlaps with the semiconductor layer SE in order to improve the channel length and/or the channel width to increase the gate drain capacitance (Cgd) to allow each switching element T3 to generate a similar feed through voltage when turned off.

In addition, in the embodiment, the gate G of the switching element T3 does not include the branch portion Ga, but the disclosure is not limited thereto.

Figure 2D:
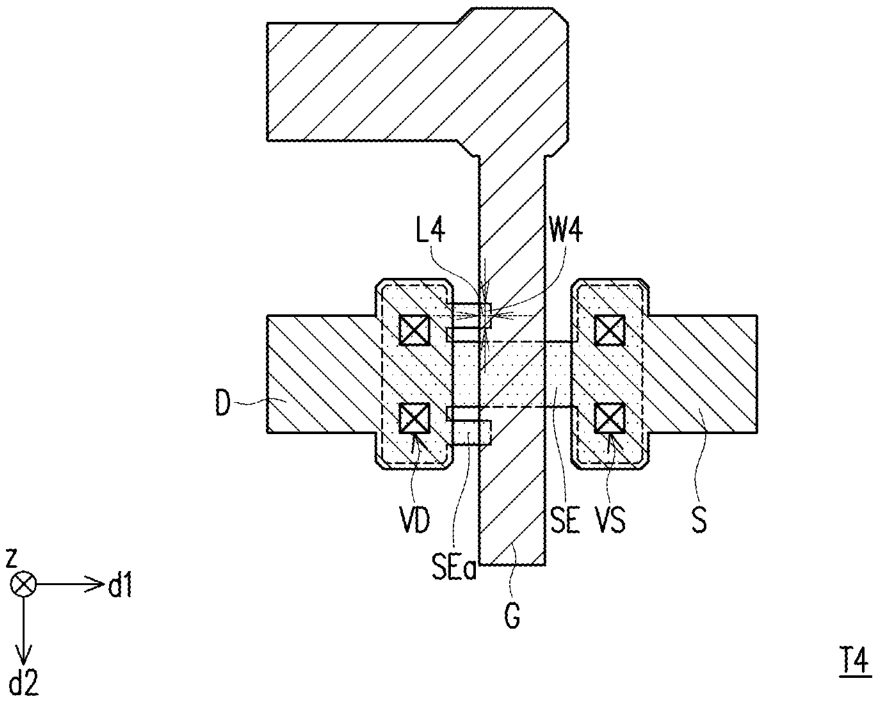
FIG. 2D is a schematic partial top view of a fourth embodiment of the switching element in the electronic device in FIG. 1.

FIG. 2D is a schematic partial top view of a fourth embodiment of the switching element in the electronic device in FIG. 1. It should be noted that the embodiment of FIG. 2D can use the reference numerals and part of the content of the embodiment of FIG. 2A. The same or similar reference numerals are used to represent the same or similar elements, and descriptions of the same technical content are omitted.

Please refer to FIG. 2D. The main difference between a switching element T4 of the embodiment and the switching element T1 is that in the switching element T4, the semiconductor layer SE further includes multiple branch portions SEa extending toward the direction d2.

In the embodiment, the branch portion SEa of the semiconductor layer SE partially overlaps with the gate G in the top view direction z of the electronic device 10. Based on this, the branch portion SEa of the semiconductor layer SE and the gate G have multiple overlapping parts. In some embodiments, the part where the branch portion SEa overlaps with the gate G in the direction d1 has a length L4, and the part where the branch portion SEa overlaps with the gate G in the direction d2 has a width W4.

In the embodiment, each switching element T4 may generate a similar feed through voltage when turned off through adjusting the length L4 and/or the width W4 of the part where the branch portion SEa of the semiconductor layer SE overlaps with the gate G. In detail, as the switching element T4 is further away from the gate driving element 210 in the direction x, the length L4 and/or the width W4 of the part where the branch portion SEa overlaps with the gate G is adjusted to increase an area where the gate G overlaps with the semiconductor layer SE. Since the semiconductor layer SE and the drain D are at the same voltage level, the channel length and/or the channel width may be improved to increase the gate drain capacitance (Cgd) to allow each switching element T4 to generate a similar feed through voltage when turned off.

In addition, in the embodiment, the gate G of the switching element T4 does not include the branch portion Ga, but the disclosure is not limited thereto.

Figure 2E:
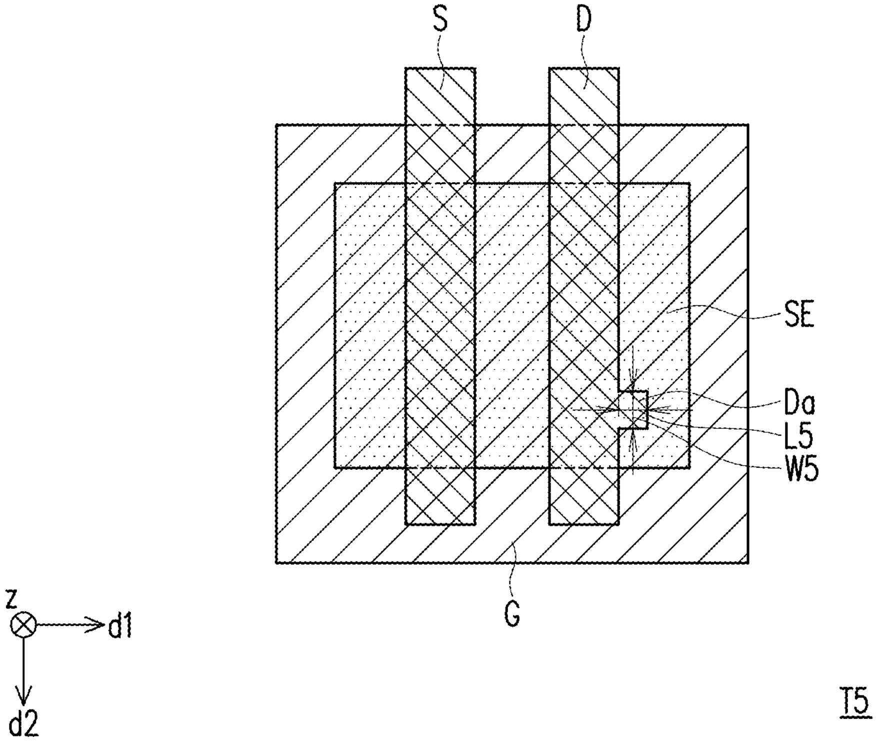
FIG. 2E is a schematic partial top view of a fifth embodiment of the switching element in the electronic device in FIG. 1.

FIG. 2E is a schematic partial top view of a fifth embodiment of the switching element in the electronic device in FIG. 1. It should be noted that the embodiment of FIG. 2E can use the reference numerals and part of the content of the embodiment of FIG. 2A. The same or similar reference numerals are used to represent the same or similar elements, and descriptions of the same technical content are omitted.

In the embodiment, a switching element T5 is a bottom gate thin film transistor, and the drain D of the switching element T5 includes a branch portion Da. The branch portion Da extends toward the direction d1 and overlaps with the gate G in the top-view direction z of the electronic device 10. In the embodiment, the part where the branch portion Da overlaps with the gate G in the direction d1 has a length L5, and the part where the branch portion Da overlaps with the gate G in the direction d2 has a width W5.

In the embodiment, each switching element T5 may generate a similar feed through voltage when turned off through adjusting the length L5 and/or the width W5 of the part where the branch portion Da overlaps with the gate G. In detail, as the switching element T5 is further away from the gate driving element 210 in the direction x, the length L5 in the direction d1 and/or the width W5 in the direction d2 of the branch portion Da is adjusted to increase an area where the branch portion Da overlaps with the gate G in order to increase the gate drain capacitance (Cgd) to allow each switching element T5 to generate a similar feed through voltage when turned off.

Figure 2F:
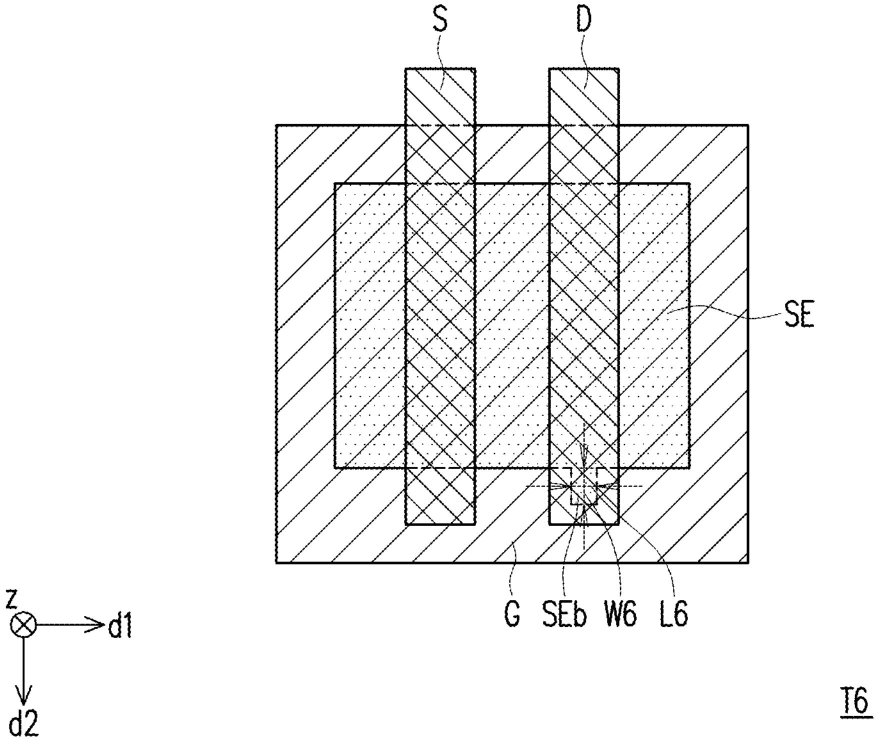
FIG. 2F is a schematic partial top view of a sixth embodiment of the switching element in the electronic device in FIG. 1.

FIG. 2F is a schematic partial top view of a sixth embodiment of the switching element in the electronic device in FIG. 1. It should be noted that the embodiment of FIG. 2F can use the reference numerals and part of the content of the embodiment of FIG. 2E. The same or similar reference numerals are used to represent the same or similar elements, and descriptions of the same technical content are omitted.

Please refer to FIG. 2F. The main difference between a switching element T6 of the embodiment and the switching element T5 is that in the switching element T6, the semiconductor layer SE further includes a branch portion SEb extending toward the direction d2, and the branch portion SEb overlaps with the gate G in the top view direction z of the electronic device 10.

In the embodiment, the part where the branch portion SEb overlaps with the gate G in the direction d1 has a length L6, and the part where the branch portion SEb overlaps with the gate G in the direction d2 has a width W6.

In the embodiment, each switching element T6 may generate a similar feed through voltage when turned off through adjusting the length L6 and/or the width W6 of the part where the branch portion SEb overlaps with the gate G. In detail, as the switching element T6 is further away from the gate driving element 210 in the direction x, the length L6 in the direction d1 and/or the width W6 in the direction d2 of the branch portion SEb is adjusted to increase an area where the branch portion SEb overlaps with the gate G. Since the semiconductor layer SE and the drain D are at the same voltage level, the gate drain capacitance (Cgd) may be increased to allow each switching element T6 to generate a similar feed through voltage when turned off.

In addition, in the embodiment, the drain D of the switching element T6 does not include the branch portion Da, but the disclosure is not limited thereto.

Figure 2G:
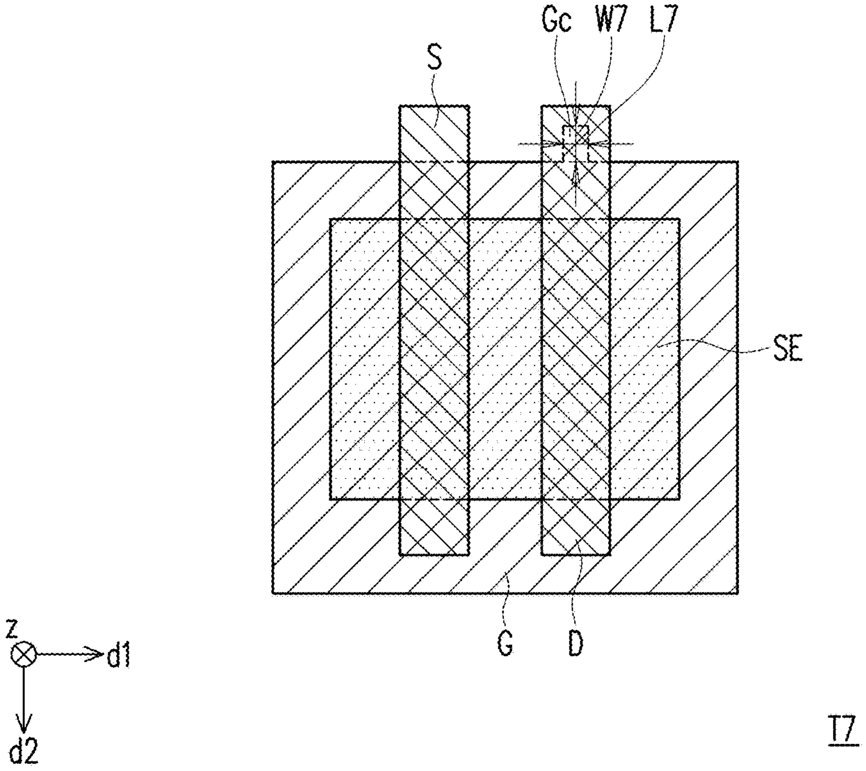
FIG. 2G is a schematic partial top view of a seventh embodiment of the switching element in the electronic device in FIG. 1.

FIG. 2G is a schematic partial top view of a seventh embodiment of the switching element in the electronic device in FIG. 1. It should be noted that the embodiment of FIG. 2G can use the reference numerals and part of the content of the embodiment of FIG. 2E. The same or similar reference numerals are used to represent the same or similar elements, and descriptions of the same technical content are omitted.

Please refer to FIG. 2G. The main difference between a switching element T7 of the embodiment and the switching element T5 is that in the switching element T7, the gate G further includes a branch portion Gc extending toward the direction d2, and the branch portion Gc overlaps with the drain D in the top view direction z of the electronic device 10.

In the embodiment, the part where the branch portion Gc overlaps with the drain D in the direction d1 has a length L7, and the part where the branch portion Gc overlaps with the drain D in the direction d2 has a width W7.

In the embodiment, each switching element T7 may generate a similar feed through voltage when turned off through adjusting the length L7 and/or the width W7 of the part where the branch portion Gc overlaps with the drain D. In detail, as the switching element T7 is further away from the gate driving element 210 in the direction x, the length L7 in the direction d1 and the width W7 in the direction d2 of the branch portion Gc is adjusted to increase an area where the branch portion Gc overlaps with the drain D in order to increase the gate drain capacitance (Cgd) to allow each switching element T7 to generate a similar feed through voltage when turned off.

In addition, in the embodiment, the drain D of the switching element T7 does not include the branch portion Da, but the disclosure is not limited thereto.

Figure 2H:
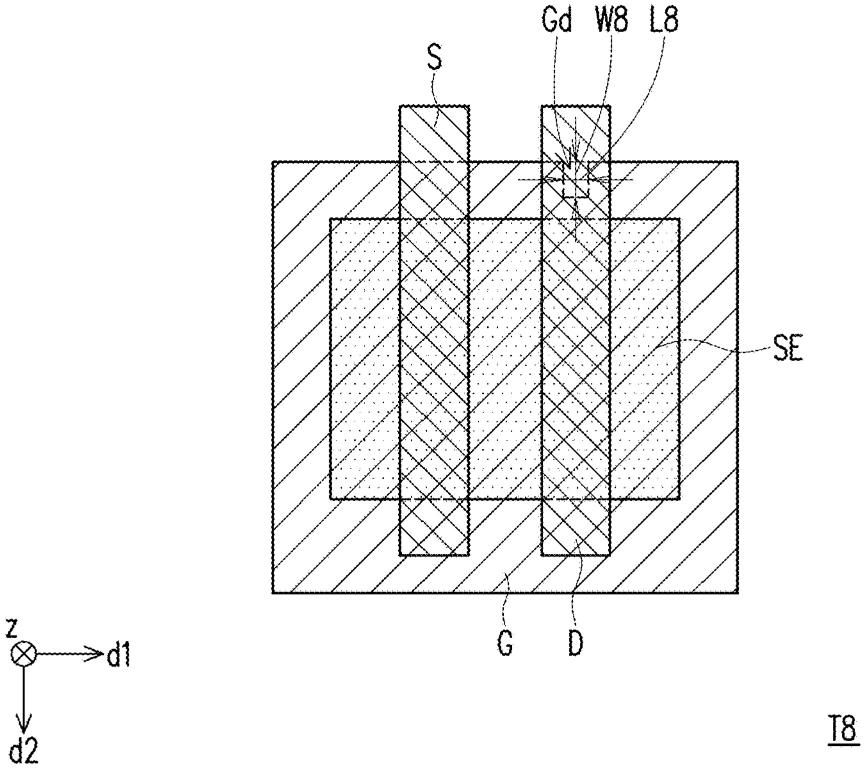
FIG. 2H is a schematic partial top view of an eighth embodiment of the switching element in the electronic device in FIG. 1.

FIG. 2H is a schematic partial top view of an eighth embodiment of the switching element in the electronic device in FIG. 1. It should be noted that the embodiment of FIG. 2H can use the reference numerals and part of the content of the embodiment of FIG. 2E. The same or similar reference numerals are used to represent the same or similar elements, and descriptions of the same technical content are omitted.

Please refer to FIG. 2H. The main difference between a switching element T8 of the embodiment and the switching element T5 is that in the switching element T8, the gate G further includes a recessed portion Gd extending toward the direction d2, and the recessed portion Gd overlaps with the drain D in the top view direction z of the electronic device 10.

In the embodiment, the part where the recessed portion Gd overlaps with the drain D in the direction d1 has a length L8, and the part where the recessed portion Gd overlaps with the drain D in the direction d2 has a width W8.

In the embodiment, each switching element T8 may generate a similar feed through voltage when turned off through adjusting the length L8 and/or the width W8 of the part where the recessed portion Gd overlaps with the drain D. In detail, as the switching element T8 is further away from the gate driving element 210 in the direction x, the length L8 in the direction d1 and/or the width W8 in the direction d2 of the recessed portion Gd is adjusted to decrease an area where the recessed portion Gd overlaps with the drain D in order to increase the gate drain capacitance (Cgd) to allow each switching element T8 to generate a similar feed through voltage when turned off.

In addition, in the embodiment, the drain D of the switching element T8 does not include the branch portion Da, but the disclosure is not limited thereto.

Figure 2I:
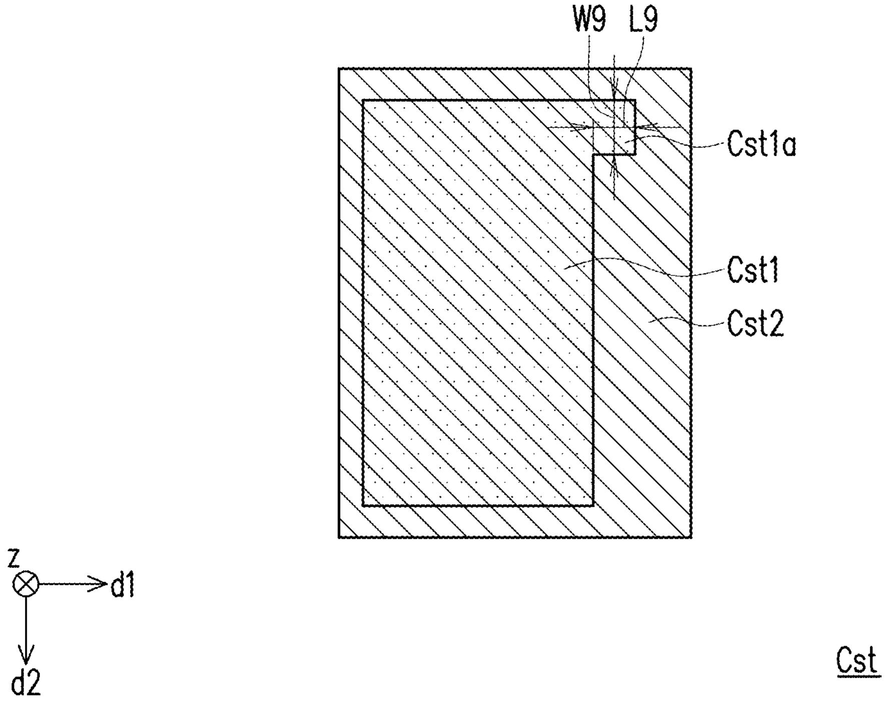
FIG. 2I is a schematic partial top view of an embodiment of the storage capacitor in the electronic device in FIG. 1.

FIG. 2I is a schematic partial top view of an embodiment of the storage capacitor in the electronic device in FIG. 1. It should be noted that the embodiment of FIG. 2I can use the reference numerals and part of the content of the embodiment of FIG. 2A. The same or similar reference numerals are used to represent the same or similar elements, and descriptions of the same technical content are omitted.

In the embodiment, the storage capacitor Cst is formed through a storage electrode Cst1, a storage electrode Cst2 and an insulating layer (not shown) interposed therebetween. The storage electrode Cst1 may belong to the same layer as the drain D of the switching element T1, but the disclosure is not limited thereto.

In the embodiment, the storage electrode Cst1 further includes a branch portion Cst1*a* extending toward the direction d1, and the branch portion Cst1*a* overlaps with the storage electrode Cst2 in the top view direction z of the electronic device 10. The branch portion Cst1*a* has a length L9 in the direction d1, and the branch portion Cst1*a* has a width W9 in the direction d2.

In the embodiment, each switching element T1 may generate a similar feed through voltage when turned off through adjusting the length L9 and/or the width W9 of the branch portion Cst1*a*. In detail, as the switching element T1 is further away from the gate driving element 210 in the direction x, the length L9 in the direction d1 and/or the width W9 in the direction d2 of the branch portion Cst1*a* is adjusted to decrease an area where the branch portion Cst1*a* overlaps with the storage electrode Cst2 in order to reduce the capacitance (Cst) between the storage electrode Cst1 and the storage electrode Cst2 to allow each switching element T1 to generate a similar feed through voltage when turned off. Since the feed through voltage generated when the switching element T2 is turned off (Vft) conforms to the foregoing formula, when the switching element T1 is further away from the gate driving element 210 in the direction x, the difference between the voltage before turned off (Vgh) and the voltage after turned off (Vgl) is may be less. Therefore, when multiple switching elements T1 are the same switching elements, the switching element T1 further away from the gate driving element 210 may produce a lower feed through voltage (Vft). Based on this, when the switching element T1 is further away from the gate driving element 210 in the direction x, every switching element T1 may generate a similar feed through voltage when turned off through reducing the capacitance (Cst) between the storage electrode Cst1 and the storage electrode Cst2.

In the embodiment, as the switching element T1 is further away from the gate driving element 210 in the direction x, the capacitance (Cst) between the storage electrode Cst1 and the storage electrode Cst2 is reduced through allowing the length L9 of the part where the branch portion Cst1*a* overlaps with the storage electrode Cst2 to be shorter, but the disclosure is not limited thereto.

In general, please refer to FIG. 1. The switching element T that is closer to the gate driving element 210 may have a higher capacitance (Cst) between the storage electrode Cst1 and the storage electrode Cst2 to allow each switching element T to generate a similar feed through voltage when turned off.

To sum up, in the electronic device provided by an embodiment of the disclosure, each switching element may generate a similar feed through voltage (Vft) through allowing the switching element closer to the gate driving element to have a lower gate drain capacitance (Cgd). Based on this, the electrical performance of the electronic device provided by an embodiment of the disclosure may be increased.

Furthermore, in the electronic device provided by another embodiment of the disclosure, each switching elements may generate a similar feed through voltage (Vft) when turned off through allowing the storage element electrically connected to the switching element that is closer to the gate driving element to have a higher storage capacitance (Cst). Based on this, the electrical performance of the electronic device provided by another embodiment of the disclosure may also be increased.

Although the disclosure has been disclosed in the above embodiments, the embodiments are not intended to limit the disclosure. Persons skilled in the art may make some changes and modifications without departing from the spirit and scope of the disclosure. Therefore, the protection scope of the disclosure shall be defined by the appended claims.

What is claimed is:

1. An electronic device, comprising:

a substrate;

a gate driving element, disposed on the substrate;

a first switching element, disposed on the substrate and having a first gate drain capacitance, wherein a drain of the first switching element comprises a first branch portion at least partially overlapping with a gate of the first switching element;

a second switching element, disposed on the substrate and having a second gate drain capacitance, wherein in a first direction, a distance between the gate driving element and the first switching element is less than a distance between the gate driving element and the second switching element, and the first gate drain capacitance is less than the second gate drain capacitance, wherein a drain of the second switching element comprises a second branch portion at least partially overlapping with a gate of the second switching element; and a plurality of electronic elements, arranged in the first direction, wherein one of the plurality of electronic elements is electrically connected to the first switching element and comprises at least one of a variable capacitor, a light emitting diode or a solar cell, and another one of the plurality of electronic elements is electrically connected to the second switching element and comprises at least one of a variable capacitor, a light emitting diode or a solar cell, wherein an area of the second branch portion in the drain of the second switching element is greater than an area of the first branch portion in the drain of the first switching element.

2. The electronic device according to claim 1, further comprising:

a third switching element, disposed on the substrate and having a third gate drain capacitance, wherein the distance between the gate driving element and the second switching element is less than a distance between the gate driving element and the third switching element, and the second gate drain capacitance is less than the third gate drain capacitance.

3. The electronic device according to claim 1, further comprising:

a fourth switching element, disposed on the substrate and having a fourth gate drain capacitance, wherein the fourth switching element and the first switching element are arranged in a second direction, and the fourth gate drain capacitance and the first gate drain capacitance are different.

4. The electronic device according to claim 1, wherein the gate of the first switching element and the gate of the second switching element individually comprise a branch portion, and the branch portion at least partially overlaps with the drain.

5. The electronic device according to claim 4, wherein an area of the branch portion in the gate of the first switching element is less than an area of the branch portion in the gate of the second switching element.

6. The electronic device according to claim 1, wherein the gate of the first switching element and the gate of the second switching element individually comprise a recessed portion, and the recessed portion at least partially overlaps with the drain.

7. The electronic device according to claim 6, wherein an area of the recessed portion in the gate of the first switching element is greater than an area of the branch portion in the gate of the second switching element.

8. The electronic device according to claim 1, wherein a semiconductor layer of the first switching element and a semiconductor layer of the second switching element individually comprise a branch portion, and the branch portion overlaps with the gate.

9. The electronic device according to claim 8, wherein an area of the branch portion in the semiconductor layer of the first switching element is less than an area of the branch portion in the semiconductor layer of the second switching element.

10. The electronic device according to claim 1, further comprising a first storage capacitor and a second storage capacitor, wherein the first switching element is electrically connected to the first storage capacitor, the second switching element is electrically connected to the second storage capacitor, and the first storage capacitor is greater than the second storage capacitor.

11. The electronic device according to claim 10, wherein the first storage capacitor and the second storage capacitor individually comprise a first storage electrode and a second storage electrode that overlap each other, and the first storage electrode comprises a branch portion.

12. The electronic device according to claim 11, wherein an area where the branch portion overlaps with the second storage electrode in the first storage capacitor is greater than an area where a branch portion overlaps with the second storage electrode in the second storage capacitor.

13. The electronic device according to claim 1, further comprising a conductive layer, wherein the conductive layer is disposed between the plurality of electronic elements and the substrate.

14. The electronic device according to claim 13, wherein the conductive layer is a heat dissipation layer, an electrostatic protection layer, an electromagnetic interference shielding layer or a combination thereof.

15. The electronic device according to claim 1, wherein the first branch portion and the second branch portion extend along the first direction.

16. The electronic device according to claim 15, wherein along a second direction different from the first direction, a width of the second branch portion of the drain of the second switching element is greater than a width of the first branch portion of the drain of the first switching element.

17. The electronic device according to claim 15, wherein along the first direction, a length of the second branch portion of the drain of the second switching element is greater than a length of the first branch portion of the drain of the first switching element.

18. The electronic device according to claim 15, wherein an area of a semiconductor layer of the first switching element is less than an area of the gate of the first switching element, and a border of the semiconductor layer is enclosed by a border of the gate.

* * * * *